Nov. 10, 1931.  A. W. WHEATON  1,830,973
COUPLING CONNECTION FOR FILLING LINES OF UNDERGROUND TANKS
Filed April 23, 1929  2 Sheets-Sheet 1
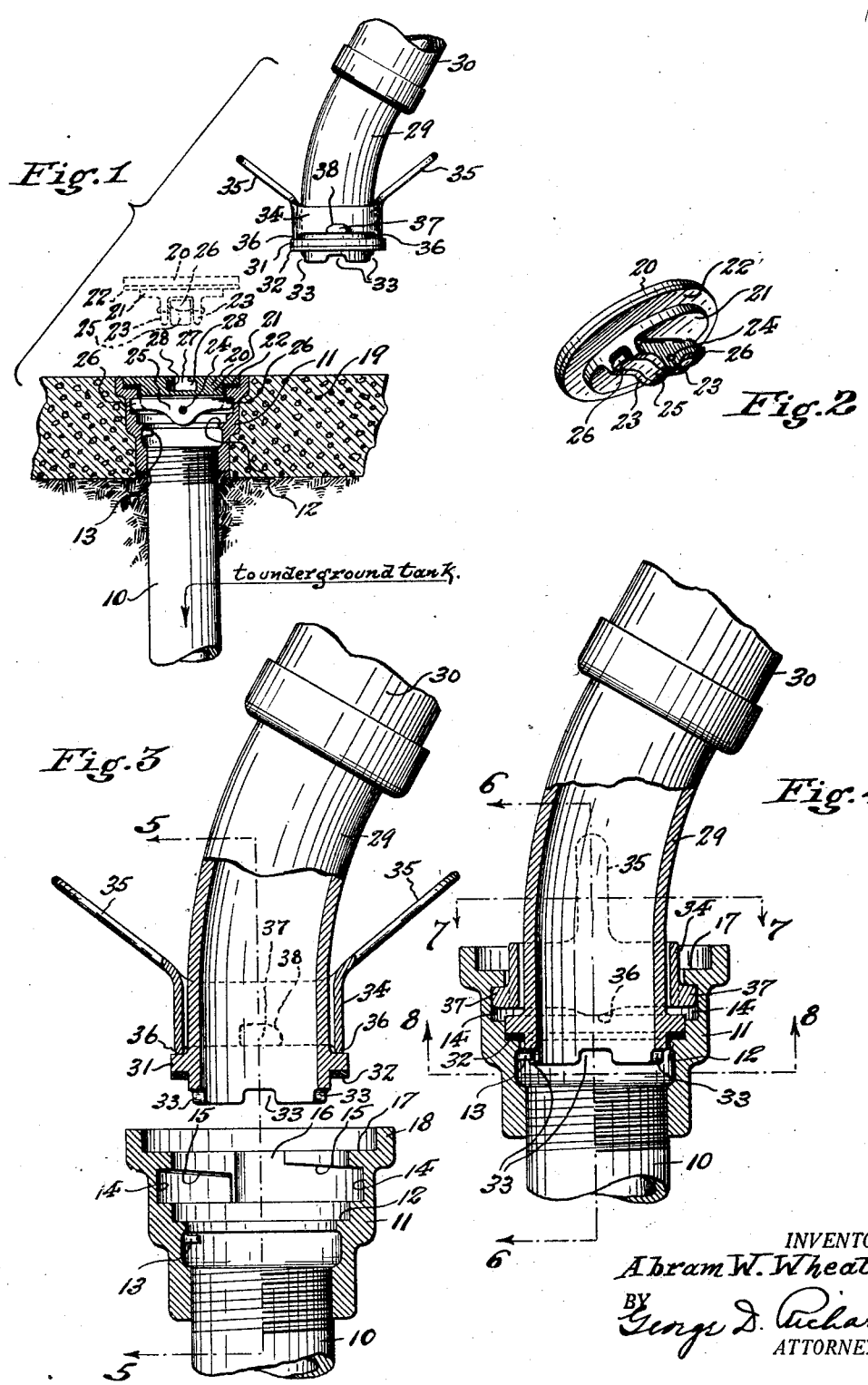
INVENTOR.
Abram W. Wheaton,
BY
George D. Richards
ATTORNEY.

Nov. 10, 1931.  A. W. WHEATON  1,830,973
COUPLING CONNECTION FOR FILLING LINES OF UNDERGROUND TANKS
Filed April 23, 1929  2 Sheets-Sheet 2
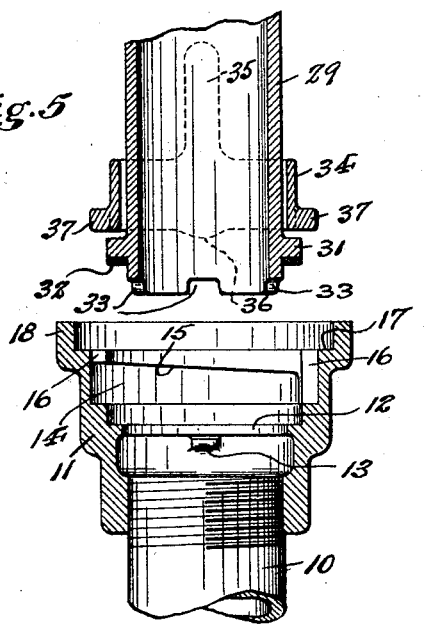
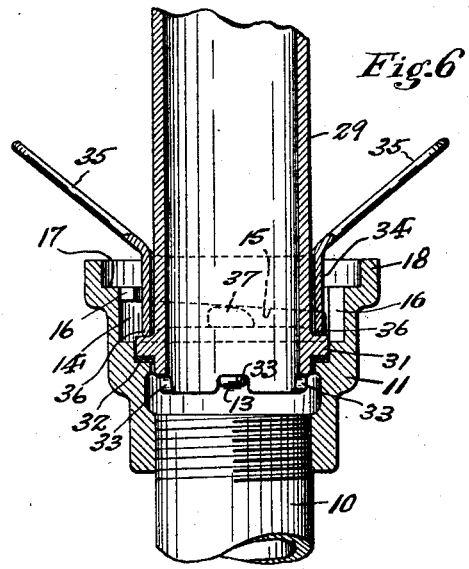
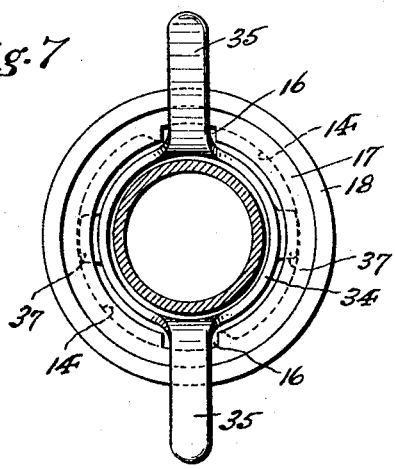
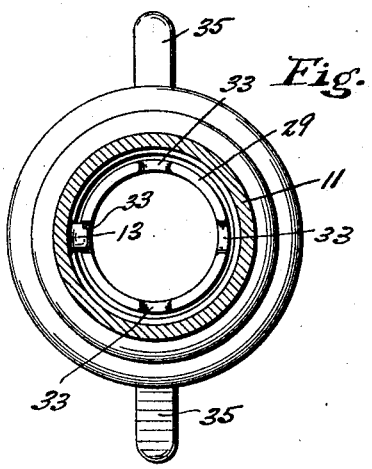
INVENTOR.
Abram W. Wheaton,
BY
ATTORNEY.

Patented Nov. 10, 1931

1,830,973

UNITED STATES PATENT OFFICE

ABRAM W. WHEATON, OF MAPLEWOOD, NEW JERSEY, ASSIGNOR TO A. W. WHEATON BRASS WORKS, OF NEWARK, NEW JERSEY, A CORPORATION OF NEW JERSEY

COUPLING CONNECTION FOR FILLING LINES OF UNDERGROUND TANKS

Application filed April 23, 1929. Serial No. 357,429.

This invention relates to improvements in coupling connections for filling lines leading to underground storage tanks, such as are used for storing fluids as, for example, gasolene, oil, etc.

This invention has for its principal object to provide a quick-acting coupling connection to join with the ground level end of a filling pipe leading to an underground storage tank a filling hose or like conduit leading from the outlet end of a tank wagon, car or other source of supply of fluid to be delivered into and stored in said underground tank; and to this end the invention provides, for permanent attachment to the upper or ground level end of a filling pipe leading to an underground tank, a novel coupling socket having a removable self-sealing cover plate, and a novel coupling nozzle, for permanent connection with a filling hose or like conduit, adapted for detachable coupled connection with said coupling socket when the cover plate of the latter is removed.

The invention has for a further object to provide a novel form of coupling connection between separable members of a conduit which is comprised of a minimum number of parts, which is self-sealing as to the joint formed between the coupled parts, and which may be easily and quickly manipulated either to couple or uncouple the conduit members.

The invention has for a further object to provide means for so interlocking the coupling nozzle to the coupling socket as to prevent rotation of the former relative to the latter, and so that the detachable coupling nozzle may be disposed and maintained in a desired selected position when in coupled engagement with the coupling socket.

Other objects of this invention, not at this time more particularly enumerated, will be clearly understood from the following detailed description of the same.

An illustrative embodiment of this invention is shown in the accompanying drawings, in which:—

Fig. 1 is a group view showing the novel coupling socket as permanently connected with a filling pipe leading to an underground tank and as embedded in the flooring or paving at the ground level above said tank, said coupling socket being shown in vertical section and its cover member being shown interlocked in closing and sealing relation thereto, the detached relation of the cover member being shown in dotted outline, and also in this group is included a side elevation of the novel coupling nozzle ready for connection with the coupling socket when the cover member is removed from the latter. Fig. 2 is a perspective view, somewhat enlarged, of the cover member of the coupling socket.

Fig. 3 is a longitudinal section through the coupling socket and coupling nozzle with the parts separated or uncoupled; Fig. 4 is a similar view with the parts in coupled relation; Fig. 5 is a vertical section taken on line 5—5 in Fig. 3; Fig. 6 is a vertical section taken on line 6—6 in Fig. 4; Fig. 7 is a horizontal cross section taken on line 7—7 in Fig. 4, and Fig. 8 is a horizontal cross section taken on line 8—8 in Fig. 4; said sections all being viewed in the direction of the arrows indicated in connection with the enumerated section lines.

Similar characters of reference are employed in all of the hereinabove described views, to indicate corresponding parts.

Referring to said drawings, the reference character 10 indicates a filling pipe which leads downwardly from ground level to an underground tank or reservoir (not shown). Suitably affixed to the upper end of said filling pipe 10, as by screwing its lower end externally over and upon the same, is an annular coupling socket 11. Integrally formed on the interior of said coupling socket is an inwardly projecting annular supporting flange or shoulder 12, and below said flange or shoulder 12 and adapted to project laterally into the interior of the coupling socket is a stop projection 13. Formed in the interior side of the wall of said coupling socket, so as to extend around the same in horizontal plane respectively from diametrical opposite points, are locking grooves or channels 14, the upper sides of which are inclined planes 15 descending from left to right. Also formed in the interior side of the wall of said coupling socket, to respectively communicate with the widest parts or receiving ends of the locking grooves or channels 14, are vertical entrance ways or grooves 16 extending downwardly from an upper seat portion 17 which is bounded by a peripheral upstanding flange 18 formed at the upper end of said coupling socket 11.

The coupling socket 11 thus constructed is preferably countersunk in the surface flooring or paving 19 which usually covers the ground level above the buried tank, and as thus arranged said coupling socket is imbedded in such flooring or paving 19 (which is ordinarily made of cement or concrete), but with its upper end open at the surface level of said flooring or paving.

Means are provided to normally close and seal the coupling socket when the same is not in use. This means comprises a cover plate 20 which is provided on its under side with a central boss 21. Arranged against the under surface of the cover plate 20 and around the boss 21 is a sealing gasket 22, which may be made of rubber, leather, fiber, or any other suitable material. Integrally formed with the boss are parallel spaced apart transverse ribs 23, between which is pivotally mounted, on the pivot pin 24 supported by said ribs, a latch piece 25 having oppositely extending lock tongues 26. To assemble the cover plate in locked and sealing relation to the coupling socket 11, said cover plate is turned to align the lock tongues 26 with the ways or grooves 16 leading to the locking grooves or channels 14. When the latch piece is thus disposed, the cover member is lowered until the sealing gasket 22 rests upon the upper seat 17 of the coupling socket, whereupon the cover plate is rotated on its vertical axis so that the lock tongues 26 will ride into the locking grooves or channels 14 in such manner as to engage the descending inclined planes 15 which bound the upper sides of said locking grooves or channels; such engagement tending to draw down the cover plate 20 to firmly press the gasket 22 into tight sealing relation to and upon the seat 17 of the coupling socket, while at the same time locking the cover plate against accidental removal. Owing to the fact that the latch piece 25 is pivoted on the pivot pin 24 it follows that the same is free to rock on the latter and will, therefore, be self-adjusting so as to equalize the downward pressure exerted by the inclined planes of the locking grooves or channels regardless of any surface inequalities which may exist in the latter. It will thus be obvious that the cover plate will be drawn down tightly, evenly and securely upon the seat 17 so as to tightly squeeze the gasket 22 between the cover plate and said seat, whereby a fluid tight joint is effected between the cover plate and the coupling socket. The fluid tight joint thus formed adequately resists downward leakage of water into and through the coupling socket, and at the same time prevents the escape of fumes which may tend to rise upwardly through the filling pipe 10. Preferably, the cover plate when in closed relation to the coupling socket 11 is countersunk therein so as to be level with the flooring or paving 19 in which the coupling socket is imbedded. In order to permit the quick and easy manipulation of the cover plate, both in attaching and removing the same from the coupling socket, said cover plate is provided in its upper side with a socket 27 having T-branches 28 whereby, when a properly formed wrench is inserted in the socket 27 and turned into the T-branches 28, not only may the cover member be rotated on its vertical axis to engage or release the lock tongues 26 with or from the locking grooves or channels 14, but may also be lifted out of and away from the coupling socket under upward pulling movement of the wrench.

The reference character 29 indicates a coupling nozzle, the upper end of which may be connected with a flexible conduit or hose 30 by any suitable means adapted to unite the one to the other. Preferably the upper end of said coupling nozzle is made in a curved form as shown, so that it may be off-set in a desired direction. Integrally formed upon and adjacent to the lower or free end of said coupling nozzle is an annular laterally projecting shoulder 31 upon the under side or face of which is arranged a sealing gasket 32. The lower marginal extremity of said coupling nozzle is provided with circumferentially spaced positioning notches 33 indented therein. Freely movable and rotatable upon said coupling nozzle 29 above the shoulder 31, is a lock collar or ring 34, having hand grips 35 oppositely projecting from its upper peripheral margin. The lower margin of said lock collar or ring 34 is provided, at diametrically opposite points, with pivoting projections 36 which are adapted to engage the upper side of the annular shoulder 31. Integrally formed with and projecting laterally from the sides of said lock collar or ring 34, in diametrical opposite extension therefrom and at right angles to the pivoting projections 36, are lock tongues 37, which preferably possess curved tops 38.

To assemble the coupling nozzle with the coupling socket in operative interlocked relation thereto, the cover plate 20 is first removed from the coupling socket, whereupon the nozzle is brought into alignment with the latter, and then lowered into the coupling socket until its lower extremity engages the stop projection 13, the nozzle being rotated on its vertical axis so that its upper curved end projects in a desired direction as governed by the selected engagement of one of its notches 33 with said stop projection 13, as shown more particularly in Figs. 4, 6 and 8. With the coupling nozzle thus arranged, the sealing gasket 32 will come to rest on the internal shoulder or flange 12. When the nozzle is thus disposed in selected position, it is ready to be locked to the coupling socket. This is accomplished by grasping the hand grips 35 and turning the lock collar or ring 34 to such position that its lock tongues 37 are aligned with the entrance ways or grooves 16 leading to the locking grooves or channels 14, whereupon the collar is lowered and turned so as to enter said lock tongues 37 in said grooves or channels 14, and into engagement with the descending inclined planes 15 of said locking grooves or channels whereby the lock collar or ring 34 is caused to press downward on the shoulder 31 of the coupling nozzle, to in turn force the sealing gasket 32 into tightly pressed seated and sealing relation to the shoulder or flange 12 of the coupling socket 11. Owing to the fact that the lock collar or ring 34 possesses the pivoting projections 36 disposed at right angles to the lock tongues 37 and adapted to bear on the shoulder 31, it follows that the lock collar or ring 34 is capable of a lateral adjusting motion on said pivot projections 36 which will cause the lock tongues 37 to bear equally against the inclined planes 15 of the locking grooves or channels 14 notwithstanding any unevenness that may exist in the latter, and consequently the shoulder 31 will be equally and levelly pressed downward to firmly squeeze the sealing gasket 32 at all points of its circumference between said shoulder 31 and the flange or shoulder 12 of the coupling socket, all of which will be obvious from an inspection of Fig. 4 more particularly.

Once the coupling nozzle is thus engaged with and locked to the coupling socket, a fluid tight joint will be established; furthermore, owing to the interlocking of the coupling nozzle against axial rotation by the mutual engagement of a notch 33 thereof with the stop projection 13 of the coupling socket, there is no risk of loosening or accidentally disengaging the coupled parts, no matter how the delivery hose to which the coupling nozzle is attached may be swung or moved about. It therefore follows that not only does the novel structure provided by this invention furnish a quick and easily manipulated coupling connection for the purposes described, but also a coupling connection that its not likely to become disengaged when in use.

It will be noted that the novel coupling connection comprises but a minimum number of parts, so that not only is the same capable of economical production but in use is under substantially no risk of becoming deranged.

Having thus described my invention, I claim:

1. Coupling connections of the kind described, comprising a coupling socket open at its upper end and having an internal annular shoulder intermediate its ends to provide a seat, a separable coupling nozzle having an external annular flange adjacent to its free end with a sealing gasket engaging its underside, a manipulatable lock collar rotatable on said coupling nozzle above said flange, said lock collar having pivotal projections to bear on said coupling nozzle flange, said flange of said coupling nozzle being adapted to carry said sealing gasket into seated relation to said seat when said nozzle is entered in said coupling socket, and said lock collar and coupling socket having interengageable cooperative devices for locking the same together with said lock collar in downwardly thrusting and holding engagement with said nozzle flange.

2. Coupling connections as defined in claim 1, in which said coupling socket is provided with an internal stop projection beneath said seat, and the free end of said nozzle is provided with indented notches selectively engageable with said stop-projection to dispose said nozzle in a selected coupled position and held against rotative displacement.

3. Coupling connections of the kind described, comprising a coupling socket open at its upper end and having an internal annular shoulder intermediate its ends to provide a seat, the interior walls of said coupling socket above said seat having locking grooves with vertical entrance ways leading downwardly thereinto, said locking grooves being bounded on their upper sides by descending inclined planes, a separable coupling nozzle having an external flange adjacent to its free end with a sealing gasket engaging its underside, a manipulatable lock collar freely movable on said coupling nozzle, said lock collar having pivoting projections on its lower end to bear on said flange, said lock collar being further provided with external lateral lock tongues oppositely projecting therefrom on a diametric line at right angles to the position of said pivoting projections, said lock tongues being engageable in and movable through said locking grooves against the bounding inclined planes thereof when said collar is lowered into and rotated in said coupling connection to thereby produce a downward thrusting pressure on said nozzle flange to force the sealing gasket thereof down on said seat and at the same time lock said nozzle to said coupling socket.

4. Coupling connections as defined in claim 3, in which said coupling socket is provided with an internal stop-projection beneath said seat, and the free end of said nozzle is provided with indented notches selectively engageable with said stop projection to dispose said nozzle in a selected coupled position and held against rotative displacement.

5. In coupling devices of the kind described, a female member having a socket open at its upper end and having an internal annular shoulder intermediate its ends to provide a seat, a separable male member having an external flange provided on its under side with a sealing gasket to engage with said seat, the interior walls of said female member having locking means with vertical entrance ways leading beneath the same, said locking means being bounded on the under sides by descending inclined planes, and said male member having a lock member, means for pivotally relating said lock member to said male member, said lock member including oppositely projecting tongues movable into engagement with said locking means against the inclined planes thereof while subject to compensating play through the pivotal relation of the lock member to said male member.

In testimony that I claim the invention set forth above I have hereunto set my hand this 13th day of April, 1929.

ABRAM W. WHEATON.